ION ACCELERATOR

Original Filed Nov. 20, 1956 2 Sheets-Sheet 1

ION ACCELERATOR

Original Filed Nov. 20, 1956 2 Sheets-Sheet 2

United States Patent Office

Re. 26,254
Reissued Aug. 29, 1967

26,254
ION ACCELERATOR

Alfred John Gale, Lexington, Mass., assignor to High Voltage Engineering Corporation, Cambridge, Mass., a corporation of Massachusetts Original No. 2,960,610, dated Nov. 15, 1960, Ser. No. 623,337, Nov. 20, 1956. Application for reissue Mar. 21, 1962, Ser. No. 184,630
16 Claims. (Cl. 250—84.5)

Matter enclosed in heavy brackets [ ] appears in the original patent but forms no part of this reissue specification; matter printed in italics indicates the additions made by reissue.

This application is related to my copending application, Serial Number 515,435, now Patent No. 2,907,884, filed June 14, 1955, for Compact Neutron Source.

This invention relates to artificial neutron sources, and in particular to a compact ion accelerator of the static-atmosphere type, together with its associated target. More specifically stated, this invention relates to a compact neutron source of the type disclosed in my said copending application, wherein a single voltage source is used for both the production and acceleration of ions.

Compact neutron sources are particularly needed in the field of neutron well-logging, in which the dimensions of the source of neutrons must be sufficiently small so that it can be lowered down a borehole of limited lateral dimensions, often five inches in diameter or less. In radioactivity well-logging, the largest housing commonly used at the present time to enclose the logging equipment which is lowered into the borehole has an outside diameter of 3⅝ inches. Moreover, a neutron source for well-logging must be capable of withstanding the high temperatures and pressures that exist in the lower regions of the borehole. Temperatures up to 300° F. and higher are encountered, and the boreholes may be more than 15,000 ft. deep and filled with water and drilling fluid. Furthermore, the instrument must be capable of remote operation, with limited power of perhaps 40 watts supplied from the surface through the logging cable. In addition, the instrument must be mechanically rigid so as to withstand accelerations of perhaps as much as 50 G.

In radioactivity well-logging it is conventional to bombard the formations of the earth surrounding a well with neutrons and to record as a function of depth the neutrons scattered by the formations or gamma rays produced in the formations by the bombarding neutrons. The conventional source of neutrons used in well-logging is a mixture of radium and beryllium. Although use of such a source permits satisfactory logging, better logs could be made were the characteristics of the source different. The large number of gamma rays emitted by a radium-beryllium source produces a large gamma-ray background radiation which may obscure the gamma rays produced by the neutrons in the formations; a source which emits few or no gamma rays is desirable. The intensity of the radiation from a conventional source is about as high as is economically permissible and it is as high as safety requirements will permit, also a source of neutrons higher in energy than those from a conventional source would permit neutrons to travel farther from the source than do those from a conventional source, and the higher energy neutrons would excite excitation levels that cannot be excited by neutrons from a conventional source. For measuring formation properties by analysis of the energy spectrum of neutrons returning from the formations it is desirable that the irradiating neutrons be nearly monoenergetic which is not so in the case of the conventional source. There are some measurements which can only be made if the source can be pulsed or turned off at will; a neutron source that can be turned off may be used safely for a higher intensity bombardment than weaker sources, since the source can be turned off when on the surface and can be turned on when down the well.

In an artificial neutron source, neutrons are produced by bombarding a suitable target with positive ions which are accelerated to high energy in an electric field between a high-voltage electrode and the target. In a neutron source of limited lateral dimensions, the voltage of the high-voltage electrode is limited by the space required for adequate insulation, and so the nuclear reaction employed must be one of those in which an adequate supply of substantially monoenergetic neutrons of relatively high energy are efficiently produced by bombarding a target with positive ions of relatively moderate energy. In radioactivity well-logging, the remoteness of the neutron source from the external power supply imposes severe limitations on the available power, and so the efficiency of the nuclear reaction employed is of prime importance.

Suitable nuclear reactions include the d, T; the t, D; the d, D; the d, Li; and the d, Be reactions. Of these reactions, the deuterium-tritium reactions are preferred, since they are the most efficient and provide neutrons having the most energy; and of the two deuterium-tritium reactions, the d, T reaction is preferred to the t, D reaction, since for a given accelerating voltage deuterons may be given a greater velocity than tritons. The kinetic energy of the bombarding deuteron together with the 17.6 mev. reaction energy is divided between the resulting neutron and alpha particle, the energy of the neutron being approximately 14 mev. The reaction cross-section depends upon the energy given the deuterons, with the most favorable energy being approximately 100 kev. for a thin target. The most favorable energy increases as the thickness of the target increases, since additional energy is required to penetrate the thicker target.

Such a deuterium-tritium reactor avoids the above-mentioned difficulties encountered with the conventional radium-beryllium source of neutrons. There are no gamma rays produced by the deuterium-tritium reaction, although, of course, gamma rays may be produced by other unavoidable reactions in the reactor since deuterium and tritium are not the only materials present. At least the principal reaction is gamma-rayless. The intensity of the radiation may be made much larger than that from conventional sources for it is limited only by the current capacity of the reactor. Safety is no problem for the reactor may be turned off by turning off the accelerating voltage, whenever it is necessary for personnel to approach the reactor. The 14 mev. neutrons from the deuterium-tritium reactors are several times as energetic as the average neutrons from the conventional source. The neutrons from the deuterium-tritium reactor are very nearly monoenergetic varying only to the extent of about 0.5 mev. due to the ballistics of the reaction, the variation depending on the energy of the incident particles. The deuterium-tritium reactor can be pulsed and turned off at will by turning off the voltage which is used to accelerate or to produce the bombarding ions.

A compact neutron source for remote operation in a borehole should be of the static-atmosphere type, wherein the region in which the ions are created is in open communication with that in which they are accelerated, both regions being sealed from the atmosphere and filled with a suitable gas, such as deuterium or tritium, at low pressure, on the order of $10^{-4}$ mm. Hg. Conventional ion accelerators have ionizable gas continuously supplied to the ion source, and the region in which the ions are accelerated is continuously evacuated in order to maintain that region at a lower pressure than that prevailing in the ion source. The pumping apparatus thus necessitated is too bulky and requires too much power for use in a borehole.

As described and claimed in my said co-pending application, the enclosure within which the gas is confined at static pressure is divided into the two regions: an ion-source region, wherein a relatively moderate electric field and a relatively intense magnetic field perpendicular to the moderate electric field exist, and an ion-accelerating region, wherein a relatively intense electric field and a relatively weak magnetic field exist. The gas pressure, as stated, is the same in both regions. Electrons emitted from an electron source within the ion-source region are accelerated by the moderate electric field, and the lengths of the paths traveled by such electrons are made very long by the intense magnetic field, so that a cumulative ion current results in the ion-source region. Ions emerging from the ion-source region into the ion-accelerating region are accelerated by the intense electric field onto a target within the ion-accelerating-region and spaced from the ion-source region. The magnetic field in the ion-accelerating region is too weak to lengthen the paths traveled by free electrons in that region by an amount sufficient to cause cumulative formation of ions pairs.

In accordance with the present invention, a single voltage source provides both the relatively moderate electric field in the ion-source region and the relatively intense electric field in the ion-accelerating region. In the following detailed description thereof, the invention will be described with particular reference to the preferred form thereof, wherein the single voltage source comprises an electrostatic belt-type generator. However, the invention is not limited to such a voltage source, but includes any static-atmosphere neutron source having two regions as hereinbefore described and having a single voltage source for both regions.

Figure 1:
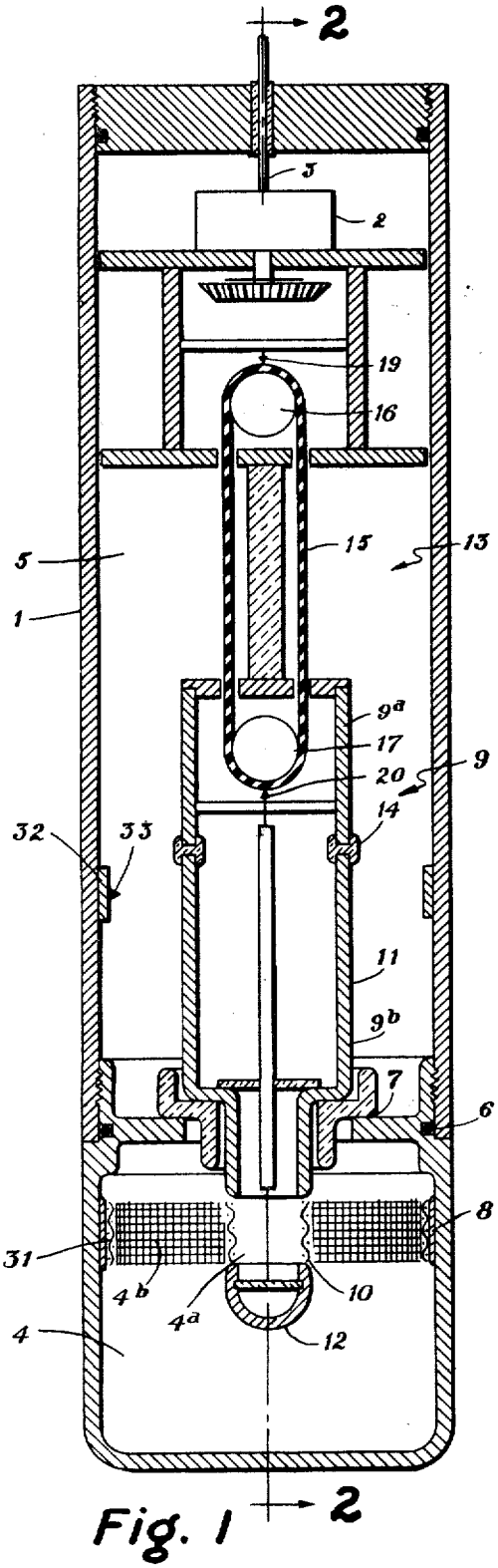
FIG. 1 is a somewhat diagrammatic view in vertical cross section of an artificial neutron source constructed in accordance with my invention.
Figure 2:
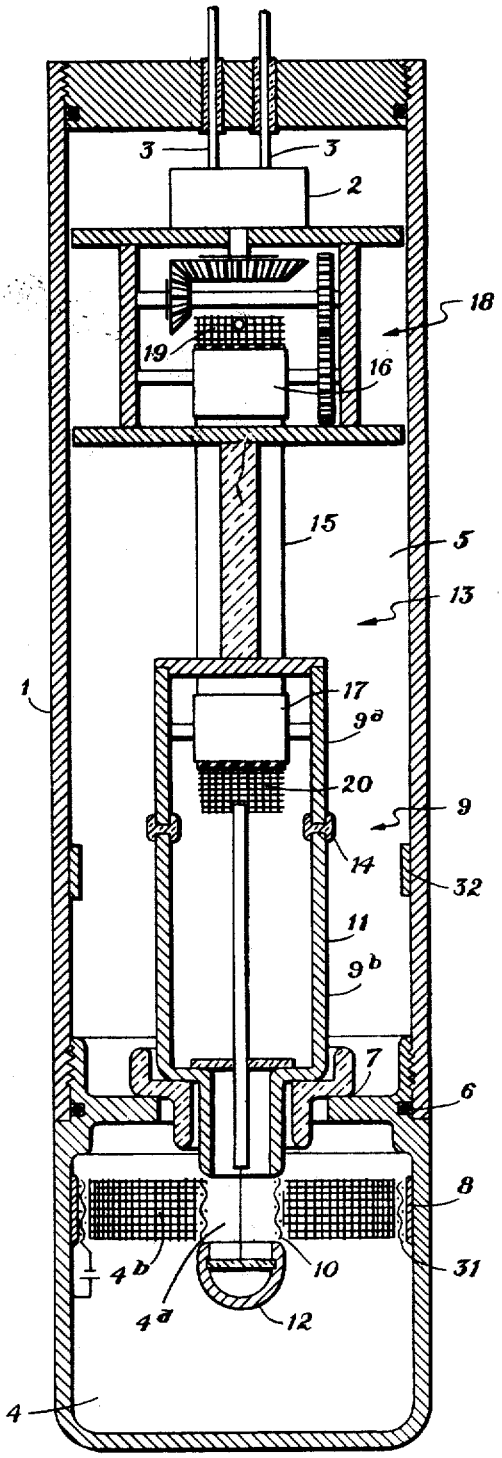
FIG. 2 is a vertical cross section along the line 2—2 of FIG. 1.

Referring to the drawings, and first to FIGS. 1 and 2 thereof, the entire neutron source, constructed in accordance with my invention, may be enclosed within a housing 1 of generally cylindrical configuration and adapted to be lowered down a borehole. The inside diameter of the housing 1 may be as small as 3 inches, so that the apparatus of FIGS. 1 and 2 may be lowered down a borehole as small as five inches in diameter. The housing 1 is of conductive material and is at ground potential. The apparatus of FIGS. 1 and 2 may be lowered and raised in the borehole by conventional apparatus well known in the well-logging art, as by a suitable cable (not shown). The entire power for operating the neutron source is derived through a single electric motor 2, to which electric power is supplied from the surface by means of suitable wires 3 which may be enclosed within the cable. In neutron well-logging operations only a limited amount of power may conveniently be transmitted down the borehole, and only a fraction of this power is available for the generation of neutrons. A representative figure for the power available for the neutron source is 40 watts out of a total of 100 watts transmitted down the borehole. In the apparatus of FIGS. 1 and 2, this power is delivered to the motor 2.

The motor 2, of course, must be of small dimensions so as to fit within the housing 1. An induction motor is preferable to a synchronous motor, because of its greater torque. A suitable induction motor would be one having a rated input of 35 watts, 115 volts, single phase, 60 cycles, operating at 6000–7000 r.p.m. and a rated output of $\frac{1}{200}$ horsepower.

The interior of the housing 1 is divided into two main compartments. The neutron-source proper is housed in the lower compartment 4. The upper compartment 5 houses the motor 2 and the voltage generators which are necessary to operate the neutron source. In operation, the upper compartment 5 is filled with a gas under pressure in order to insulate the various high-voltage parts of the apparatus from the grounded housing 1. The lower compartment 4 is filled with a suitable gas, such as deuterium or tritium, at very low pressure. These two compartments 4, 5 are therefore hermetically closed off from the surrounding atmosphere, as by suitable gaskets 6, and from each other, as by suitable vacuum-tight seals 7.

The lower compartment 4 constitutes the static-atmosphere enclosure hereinbefore referred to and accordingly it is divided into two regions: and ion-source region 4a and an ion-accelerating region 4b. In the apparatus of FIGS. 1 and 2, the ion-source region 4a is located centrally in the housing 1, and a target 8 is supported circumferentially about the ion-source region 4a near the housing 1, so as to be spaced from the ion-source region 4a. This arrangement has certain advantages to be described; however, other arrangements are possible, such as that diagrammatically shown in FIG. 5, wherein both the ion-source region 4a' and the target 8' are located centrally in the housing 1, being mutually spaced along the axis of the housing 1.

Referring again to FIG. 1, the mutual isolation of the electric fields in the ion-source region 4a and the ion-accelerating region 4b is accomplished by enclosing the ion-source region 4a in a hollow electric 9, which acts as a Faraday cage. In order to permit the passage of ions therethrough, a portion of the hollow electrode 9 comprises a conductive mesh or screen 10 which fits between a main hollow electrode 11 and a hollow substantially hemispherical end-piece 12. For example, a 50 x 50 mesh of .009-inch diameter stainless-steel wire may be used for this purpose. The "hollow electrode 9" thus refers to the combination of the main hollow electrode 11, the screen 10, and the end-piece 12.

Power is required to maintain the electric field in the ion-accelerating region 4b, since this electric field is doing work by accelerating ions from the ion-source region 4a to the target 8. Power is also required to maintain the electric field in the ion-source region 4a, since this electric field is doing work by separating gas molecules into ion pairs. Power is not required to maintain the magnetic field in the ion-source region 4a, since the magnetic field does no work.

In accordance with my invention, both the ion-accelerating voltage and the ion-source voltage are generated by a single voltage source, which preferably comprises an electrostatic belt-type generator. *As is well known, an electrostatic belt-type generator is a source of constant current.*

The principle of operation of an electrostatic belt-type generator is well known. Such a generator comprises essentially a hollow electrode on which electric charge is accumulated, an insulating belt which carries electric charge from ground to the interior of the hollow electrode, means for depositing electric charge on the belt at ground, and means for transferring electric charge from the belt to the hollow electrode. The mechanical energy used to drive the belt is thus converted into the potential energy of the accumulation of electric charge on the hollow electrode, and this potential energy is subsequently converted into the kinetic energy of a current flow. This energy conversion is very efficient. Thus, in the apparatus of FIGS. 1 and 2, more than 70% of the mechanical energy supplied by the motor 2 is converted into the kinetic energy of a current flow, so that a motor supplying 1/200 H.P., or 3.73 watts, enables the generator to deliver 20 $\mu$a. at 150 kv., or 3 watts.

Where, as in the apparatus of FIGS. 1 and 2, the ion-source is at high potential, the voltage source for the ion-source must also be at high potential. This means that the external power necessary to operate the voltage source must be delivered from ground to a high potential. If electric power is thus delivered from ground to high potential, the problem of insulating the leads for conveying the electric power is a severe one. In accordance with the invention the additional voltage source for the ion source is eliminated.

Referring to FIGS. 1 and 2, the hollow electrode 9, which serves to isolate the electric field in the ion-source region 4a from the electric field in the ion-accelerating region 4b, also serves as the hollow electrode of the main electrostatic belt-type generator 13. The hollow electrode 9 is divided into two parts, as shown at 9a and 9b, separated by an insulator 14.

Electric charge is carried to the upper half 9a of the hollow electrode 9 on an endless belt 15 of insulating material, which is supported between two pulleys 16, 17. The upper pulley 16 is rotated by means of the motor 2, which drives the pulley 16 through a gear train 18 (FIG. 2). The lower pulley 17 is mounted within the hollow electrode 9.

A wire screen 19 is supported, at ground potential, so that one edge thereof barely touches the surface of the belt 15 as the belt 15 passes around the upper pulley 16. A second wire screen 20 is supported within and electrically connected to the upper half 9a of the hollow electrode 9, so that one edge of the wire screen 20 barely touches the surface of the belt 15, as the belt 15 passes around the lower pulley 17.

The electrostatic belt-type generator 13, as illustrated, in its preferred form, is self-excited, with the charging of the belt 15 being initiated by friction between the belt 15 and at least one of the pulleys 16, 17. For excitation purposes, only the outer surface of at least one of the pulleys 16, 17 need be of insulating material, and the other pulley may comprise a conductive member. However, preferably the outer surfaces of both pulleys 16, 17 are of insulating material. The choice of insulating materials must be such that the insulating material of the upper pulley 16, the belt 15, and the lower pulley 17 follow an ascending sequence in the triboelectric series if a positive potential is to be generated at the hollow electrode 9, and a descending sequence in the triboelectric series if a negative potential is to be generated at the hollow electrode 9. Thus, if a silicone rubber belt of the type described in my said co-pending application is employed, and if a positive potential is to be generated at the hollow electrode 9, the upper pulley 16 may comprise a short length of polyethylene tubing. In order that it may withstand high-temperature conditions, the polyethylene tubing must be cross-linked, as by irradiating it with high-energy electrons, prior to use in the generator. The lower pulley 17 may then comprise a short length of glass tubing.

When the motor 2 drives the upper pulley 16, friction between the pulley 16 and the belt 15 creates a small amount of negative charge on the pulley 16, which causes positive charge to be deposited by corona from the grounded screen 19 onto the outer surface of the belt 15. Despite the fact that the grounded screen 19 apparently touches the belt 15, there will nevertheless always be a thin layer of gas between the screen 19 and the belt 15. Ionization of this gas by the electric field at the edge of the screen 19 constitutes the corona. Since the corona originates from the sharp points at the edge of the screen, the screens 19, 20 should be of as fine a mesh as practical so as to present a maximum number of sharp points towards the belt 15. Neglecting for the moment any charge on the lower pulley 17, as well as any fields due to the potential difference between the two halves, 9a, 9b, of the hollow electrode 9, the only electric field within the hollow electrode 9 in the vicinity of the screen 20 is that due to the positive charge of the belt 15, regardless of the amount of electric charge which has accumulated on the hollow electrode 9, owing to the fact that the hollow electrode 9 acts as a Faraday cage. When this positive charge arrives opposite the screen 20, the resultant high gradient between the belt 15 and the screen 20 causes ionization of the intervening gas (i.e. corona), and a flow of positive charge to (or, more correctly, a flow of negative charge from) the screen 20.

The lower pulley 17 may comprise a conductive member. However, performance is improved if the lower pulley 17 is composed of an insulating material such as glass, so that friction between the pulley 17 and the belt 15 creates a small amount of positive charge on the pulley 17. This serves to augment the transfer of positive charge to (or negative charge from) the screen 20; and, in fact, results in a net negative charge on the belt 15. As the belt 15 carries this net negative charge back to ground, the positive potential of the hollow electrode 9 tends to increase in the same manner as though the belt were carrying positive charge to the hollow electrode 9. Thus both halves of the belt 15, that approaching and that leaving the hollow electrode 9, assist in the delivery of positive charge to the hollow electrode 9.

It is not necessary that the electrostatic belt-type generator 13 be self-excited, and an external belt-charging power supply may be employed. However, where a compact design is desired, as in the field of neutorn well-logging, it is advantageous to eliminate the additional power supply which is required to charge the belt in a non-self-excited generator.

The voltage between the hollow electrode 9 and the housing 1 should be maximized, since this is the voltage across the ion-accelerating region 4b. The voltage supportable across the ion-accelerating region 4b tends to increase with increased spacing between the hollow electrode 9 and the housing 1. However, increasing this spacing for a housing 1 of fixed inner diameter necessitates increasing the curvature at the surface of the hollow electrode 9, which in turn increases the voltage gradient at that surface. Since the permissible voltage is limited to a value for which the maximum gradient in the ion-accelerating region 4b is below the breakdown gradient, there is an optimum outside diameter for the hollow electrode 9. Where, as in the apparatus of FIGS. 1 and 2, the hollow electrode 9 is positively charged, the optimum outside diameter for the hollow electrode 9 is approximately one-third the inner diameter of the housing 1, in order to achieve maximum voltage across the ion-accelerating region 4b. This optimum outside diameter for the hollow electrode 9 is used in the lower compartment 4, as shown in FIGS. 1 and 2.

However, it is desirable to construct the upper end of the hollow electrode 9 with as large an outside diameter as possible, in order that the belt 15 may be as wide as possible. This is because, as described in my said co-pending application, the current-carrying capacity of the belt 15 increases with belt width. The outside diameter of the hollow electrode 9 may be greater within the upper compartment 5 than within the lower compartment 4 if the insulating property of the medium separating the hollow electrode 9 from the housing 1 is greater in the upper compartment 5 than in the lower compartment 4. The lower compartment 4 is, of necessity, filled with a gas at a pressure on the order of $10^{-4}$ mm. Hg. If the upper compartment 5 is filled with a suitable gas under pressure, and if the outside diameter of the hollow electrode 9 in the lower compartment 4 has its optimum value of one-third the inside diameter of the housing 1, then the outside diameter of the hollow electrode 9 within the upper compartment 5 may be greater than one-third the inside diameter of the housing 1. In general, the insulating property of a gas increases with increased pressure. However, there is an upper limit to the pressure of the gas within the upper compartment 5, owing to the fact that the corona current obtainable at the screens 19, 20 decreases with increased gas pressure. As determined by my experiments, the gas pressure in the upper compartment 5 must be in the range between 100 and 400 p.s.i. gage for satisfactory operation, and the optimum pressure is about 300 p.s.i. gage. With the gas pressure in this range, the upper end of the hollow electrode 9 may have an outside diameter of about one-half inside diameter of the housing 1. I have obtained good results with carbon dioxide, although other gas compositions, such as nitrogen, may be used. Preferably only gases which are predominantly non-electropositive are used as the insulating gas in the upper compartment 5.

It may be noted that the gas under pressure in the upper compartment 5 increases the efficiency of the motor 2, since it is able to conduct heat away from the motor 2 more rapidly than atmospheric air.

Figure 3:
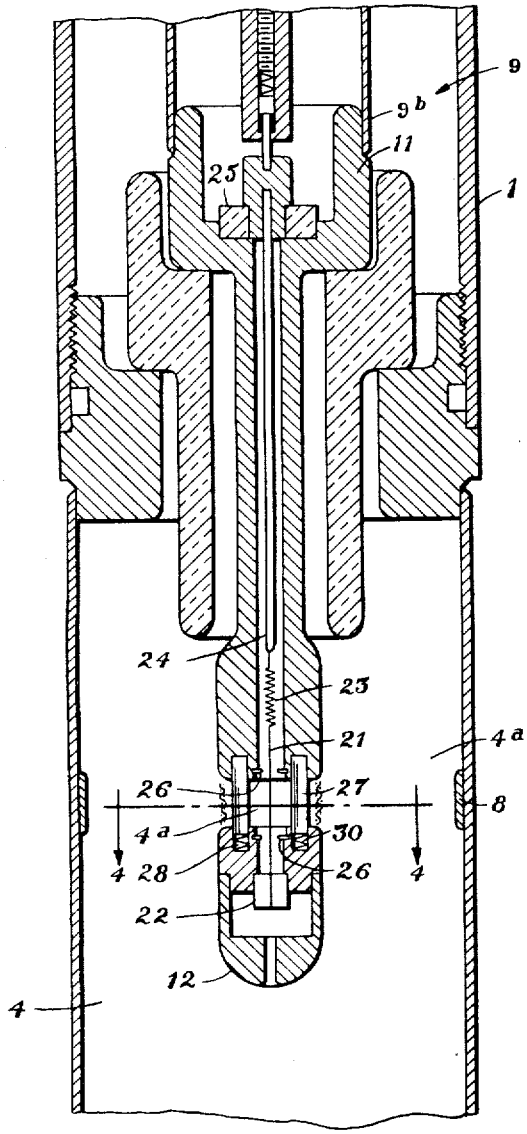
FIG. 3 is a vertical cross section illustrating in detail the lower portion of the apparatus of FIGS. 1 and 2.
Figure 4:
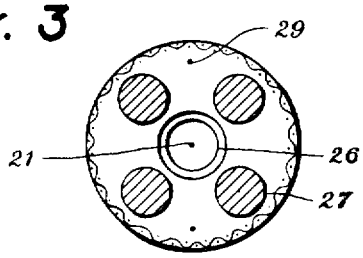
FIG. 4 is a horizontal cross section along the line 4—4 of FIG. 3.

Referring now to FIGS. 3 and 4, therein are shown the various components for the production of ions, which are located within the hollow electrode 9. As hereinbefore stated, there exists within the ion-source region 4a a moderate electric field and a relatively intense magnetic field. The purpose of the moderate electric field is to impart kinetic energy to free electrons within the ion-source region 4a, and to assist in the production of free electrons by the phenomenon of high field emission. The purpose of the relatively intense magnetic field is to cause these free electrons to travel very long paths within the confines of the ion-source region 4a.

The mean free path of an electron moving through a gas is the average value of the different distances the electron moves between successive collisions with gas molecules. The mean free path of an electron in deuterium gas at a pressure on the order of $10^{-4}$ mm. Hg is on the order of $10^2$ cm., and it is clear that in the absense of a magnetic field the ionization produced in the gas within the lower compartment 4 will be negligible, since the dimensions of the lower compartment 4 are much less than the mean free path of an electron therein. The magnetic field in the ion source region 4a must therefore be sufficiently intense so that the lengths of the paths traveled by electrons therein are well above the mean free path of such electrons in the gas.

Moreover, it is not enough that the free electrons in the ion-source region 4a collide with gas molecules. Upon collision, the electrons must have sufficient energy to cause ionization of the gas molecules. The necessary energy is on the order of 30 ev., but, since the magnetic field causes the electrons to follow curved trajectories through the electric field, the applied voltage must be well in excess of 30 volts if the desired ionization is to occur.

Referring again to FIGS. 3 and 4, a filament 21 is centrally suspended within the hollow electrode 9. One end of the filament 21 is attached to an insulator 22 within the end-piece 12, and the other end of the filament 21 is attached to a light-tension spring 23, which is suspended from a conductive rod 24 supported by an insulator 25 within the main hollow electrode 11. The conductive rod 24 serves to connect the filament 21 to the upper half 9a of the hollow electrode 9. The lower half 9b of the hollow electrode is maintained at a positive potential which is lower than that of the upper half 9a of the hollow electrode 9 in a manner to be described in detail hereinafter, thereby providing the necessary electric field between the filament 21 and the lower half 9b of the hollow electrode 9. It will be recalled that the lower half 9b of the hollow electrode 9 is electrically connected to the grid 10, the main hollow electrode 11 and the end piece 12, so that the electric field between these members and the filament 21 extends throughout the region 4a. The field thus extends from the filament 21 to the grid 10 as well as from the filament 21 to the apertured disks 26 hereinafter referred to.

Two very thin apertured disks 26 of conductive material are inserted in the central apertures of the end-piece 12 and the main hollow electrode 11, respectively, at their mutually opposing faces. The inner edges of the disks 26 are made sharp in order to provide a high voltage gradient at these edges. Owing to the potential difference between the filament 21 and the lower half 9b of the hollow electrode 9, an electric field exists therebetween which is concentrated at the sharp inner edges of the apertured disks 26. This field concentration is sufficient to cause the emission of electrons from the inner edges of the disks 26, which therefore serve as the necessary source of free electrons in the ion-source region 4a. Such electrons are attracted to the filament 21, but, owing to the intense magnetic fields existing in the ion-source region 4a, these electrons are deflected so that they travel very long paths through the deuterium or tritium gas before reaching the filament 21, and hence are able to create a sufficient number of ion pairs by collisions with gas molecules to trigger a cumulative creation of ions, with the free electron of each ion pair so produced assisting in the ionization process. Electron path length is also maximized by having the filament 21 of very small diameter, so as to decrease the probability of its capturing the free electrons.

A suitable number of permanent magnets 27, such as four, are supported between the end-piece 12 and the main hollow electrode 11 by being loosely fitted into sockets 28 in the mutually opposing faces of the end-piece 12 and the main hollow electrode 11. Material such as Alnico, which is suitable for the creation of the necessary intense magnetic field, may not have sufficient mechanical strength to support the end-piece 12. In this event, supporting rods 29 may be employed to provide the mechanical connection between the end-piece 12 and the main hollow electrode 11, and the magnets 27 are held rigidly in place by means of springs 30. All of the magnets 27 must be oriented in the same direction: that is, either all the north poles or all the south poles must be in the sockets 28 of the end-piece 12.

The above-described magnet configuration provides a magnetic field which is relatively intense in the ion-source region 4a but relatively weak in the ion-accelerating region 4b. Owing to the concentration of the magnetic field in the ion-source region 4a, the relatively few free electrons produced by high-field emission at the inner edges of the disks 26 are sufficient to produce the desired ion current in the ion-source region 4a with negligible ion formation in the ion-accelerating region 4b. Since the ion formation in the ion-accelerating region 4b is negligible, nearly all the ions accelerated by the intense electric field in the ion-accelerating region 4b arrive at the target 8 after falling through the entire potential drop between the lower half 9b of the hollow electrode 9 and the target 8. Thus the potential energy stored in the hollow electrode 9 is converted almost entirely into the kinetic energy of ions having enough energy for the efficient production of neutrons at the target 8. If the magnetic field in the ion-accelerating region 4b were intense enough to cause cumulative formation of ions in that region, much of the potential energy stored in the hollow electrode 9 would be wasted in the acceleration of ions to energies insufficient for the efficient production of neutrons.

Optimum results are obtained with a magnetic field of about 400 gauss. In apparatus of the type shown in FIGS. 1 and 2 and designed to fit into a housing 1 having a 3-inch inside diameter, a magnetic field of about 400 gauss has been obtained in the region bounded by the magnets 27, using four Alnico permanent magnets ⅛ inch in diameter and positioned symmetrically on a ⅝-inch diameter circle.

There will be some degree of concentration of magnetic field just outside the region bounded by the magnets 27. Moreover, the edges of the mesh 10 are sharp, and concentration of voltage gradient will tend to occur at these edges. The edges of the mutually opposing faces of the main hollow electrode 11 and the end-piece 12 are therefore well-rounded, so as to provide a region of low voltage gradient in the vicinity of the mesh 10 and just outside the region bounded by the magnets 27, thereby minimizing the undesirable effects of the sharp edges of the mesh 10 and the magnetic field just outside the region bounded by the magnets 27.

The gas pressure within the lower compartment 4 must be less than $10^{-3}$ mm. Hg, and the optimum pressure is on the order of $10^{-4}$ mm. Hg. At pressures above $10^{-3}$ mm. Hg, the mean free path of an electron is on the order of magnitude of the dimensions of the neutron source, thus tending to cause electrical breakdown in the ion-accelerating region 4b.

The positive potential applied to the filament 21 with respect to the lower half 9b of the hollow electrode 9 must be more than 400 volts, and the optimum voltage is about 3 kv. At potentials below 400 volts the magnetic field required would be prohibitively large since the lengths of the paths traveled by free electrons in the ion-source region 4a would have to be far in excess of the mean free path in order to provide a reasonable probability that collisions between electrons and gas molecules would result in ionization.

With a magnetic field of 400 gauss and a gas pressure of $3\times10^{-4}$ mm. Hg, an ion-source current of 25 microamperes may be obtained with a positive potential of 3 kv., applied to the filament 21.

Figure 5:
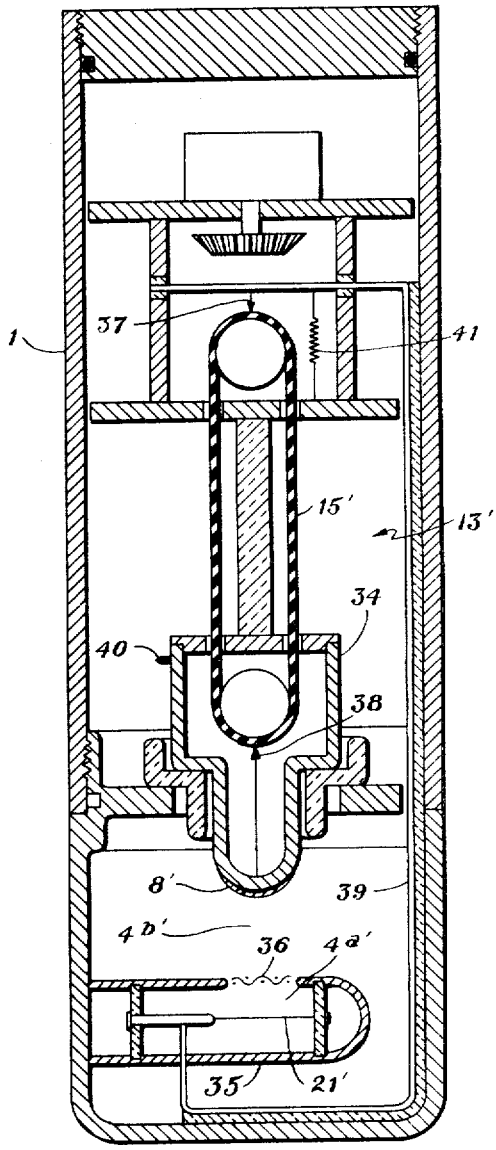
FIG. 5 is a somewhat diagrammatic view in vertical cross section illustrating a modified arrangement of the ion source and target of an artificial neutron source constructed in accordance with my invention.

In addition to the voltage needed to produce the electric field in the ion-source region 4a, a high voltage is required for the acceleration of ions in the ion-accelerating region 4b (see FIGS. 1 and 2). In the apparatus of FIGS. 1 and 2, a high positive potential is applied to the hollow electrode 9 with respect to the grounded target 8. In the apparatus of FIG. 5, a high negative potential is applied to the target 8' with respect to the ion-source region 4a'. For the d, T reaction, this accelerating voltage must be at least 75 kv. for neutron production and at least 100 kv. for maximum efficiency of neutron production with a thin target. The minimum voltage for maximum efficiency of neutron production increases with target thickness. Since even a thick target is very thin in comparison with the width of the ion-accelerating region 4b, the target should be as thick as possible for efficient neutron production with the accelerating voltage available. The accelerating voltage is limited only by the lateral dimensions of the borehole. In the apparatus of FIGS. 1 and 2, if the inside diameter of the housing 1 is 3 inches, the optimum outside diameter of the hollow electrode 9 (in the lower compartment 4) for maximum voltage is about 1 inch, and the accelerating voltage will be in the range between 150 kv. and 200 kv.

As hereinbefore stated, the only power sources required to operate the neutron source are the ion-accelerating voltage source and the ion-formation voltage source. In accordance with my invention, both of these voltages are provided by a single voltage source. Referring now to FIGS. 1 and 2, the belt 15 of the generator 13 delivers electric charge to the upper half 9a of the hollow electrode 9, and thence to the filament 21 by means of the conductive rod 24. Since the lower half 9b of the hollow electrode 9 is insulated from the upper half 9a by the insulator 14, the potential of the filament 21 rises with respect to that of the lower half 9b until a current flows from the filament 21 to the lower half 9b, which current comprises principally the current due to the formation of ion pairs in the ion source region 4a of the neutron. There is also a negligible additional current due to the electrons emitted at the disks 26 by high field emission.

The current in the ion-source region 4a effects a transfer of positive charge from the filament 21 to the lower half 9b; and, since the lower half 9b is insulated not only from the filament 21 but also from ground, the potential of the lower half 9b rises with respect to ground until a current flows from the lower half 9b to the target 8 or the housing 1, which current comprises principally the current in the main ion beam delivered to the target 8 and leakage currents. In addition, there may be some current arriving at ground due to secondary electrons emitted at the target 8 and to the formation, by these secondary electrons or by the main ion beam, of ion pairs in the ion-accelerating region 4b of the neutron source. This current may be minimized by providing a suppressor grid 31 in the vicinity of the target 8. Since only a relatively small negative bias need be applied to the suppressor grid 31 with respect to the grounded target 8, a conventional voltage source may be employed for this purpose.

The voltage of the lower half 9b will continue to rise until the current therefrom equals the current thereto; that is, until the sum of the ion-beam current and leakage currents equal the ion-source current, which in turn is equal to the current delivered by the belt 15 to the filament 21.

In order to achieve stability, a metal band 32, having a sharp corona point 33 on its inner surface is inserted within the housing 1 so that the point 33 is opposite the lower half 9b of the hollow electrode 9. The resultant current flow from the lower half 9b to the point 33 is one which is negligible up to a certain voltage $V_c$ and which rises rapidly as the voltage across the corona gap increases above $V_c$. In this manner, by suitable positioning and shaping of the point 33, the voltage of the lower half 9b may be stabilized at the value $V_c$.

For example, in a representative neutron source of the type described, the voltage $V_c$ of the lower half 9b of the hollow electrode 9 might be +200 kv., the voltage of the filament with respect to 9b 21 might be 3 kv., the belt current and the ion-source current might each be 40 microamperes, and the ion-beam current might be 20 microamperes.

Where the ion source is at ground potential, the modification of the invention shown in FIG. 5 may be used. Referring to said FIG. 5, the generator 13' shown therein is similar to the generator 13 shown in FIGS. 1 and 2, except that the generator 13' of FIG. 5 is adapted to produce a high negative potential, and except that the hollow electrode 34 of FIG. 5, upon which said negative potential is produced, does not enclose the ion source assembly. Instead of enclosing the ion source assembly, the hollow electrode 34 serves to support the target 8', which is thus maintained at a high negative potential.

The ion source of FIG. 5 is similar to that shown in FIGS. 1–4, and includes a filament 21' surrounded by an outer electrode 35. The wire mesh 36 of FIG. 5 is similar to the wire mesh 10 of FIGS. 1–4, except that it need extend only over that portion of the outer electrode 35 which faces the target 8'.

A wire screen 37 sprays negative charge onto the belt 15' of the generator 13'. This negative charge is collected from the belt 15' by the wire screen 38 inside the hollow electrode 34. The filament 21' is connected to the wire screen 37 by means of a lead 39, which for most of its length may be supported upon but insulated from the housing 1. The outer electrode 35 is at ground potential, being connected directly to the housing 1.

The operation and control of the apparatus of FIG. 5 is similar to that of the apparatus of FIGS. 1 and 2. The generator 13' maintains a high-voltage potential difference between the target 8' and the filament 21', and the potential difference between the filament 21', and the grounded outer electrode 35 assumes that value for which the current to the outer electrode 35 equals the current therefrom. Voltage stability may be achieved by any suitable device, such as the corona point 40, which is connected to the negative electrode 34, so as to face the grounded housing 1. The filament 21' may be connected to ground through a high resistance 41.

In general, the invention will be used in devices in which the current through the ion-source region 4a or 4a' is greater than the current (exclusive of voltage-stabilizing corona currents) through the ion-accelerating region 4b or 4b'. If for any reason this condition does not prevail, it is necessary to pad the ion-source region 4a or 4a' with an extra load. Such an extra load is shown in FIG. 5 as a resistor 41 which is connected between the filament 21' and ground. In the usual case, however, the aforementioned condition does prevail and the resistor 41 is then unnecessary.

Figure 6:
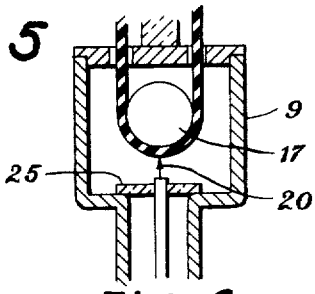
FIG. 6 is a somewhat diagrammatic view in vertical cross section illustrating a modification of the apparatus of FIGS. 1 and 2.

It is possible, without departing from the spirit and scope of the invention, to eliminate the upper part 9a of the hollow electrode as well as the insulator 14 in the apparatus of FIGS. 1 and 2, and such a modification is shown in FIG. 6. Referring to said FIG. 6, the hollow electrode 9 is at the same potential throughout its extent, and the filament 21 and wire screen 20 are insulated therefrom by the insulator 25.

Having thus described the principles of the invention, together with several illustrative embodiments thereof, it is to be understood that although specific terms are employed, they are used in a generic and descriptive sense, and not for purposes of limitation, the scope of the invention being set forth in the following claims.

I claim:

1. A compact apparatus for accelerating ions which is adapted to operate in restricted areas such as boreholes or other areas to which only a limited amount of electric power can be supplied, comprising in combination: a source of positive ions including an anode, a cathode including a hollow electrode enclosing said anode, and means for producing a magnetic field of sufficient intensity to cause electrons accelerated between said cathode and said anode to initiate and maintain a discharge within the source of positive ions despite the low pressure of the gas in the hollow electrode; a target spaced from said source of positive ions; a hermetically sealed enclosure enclosing said source of positive ions and said target and containing gas at reduced pressure; a single electrostatic belt-type generator adapted to deliver positive electric current from said target to said anode, whereby an electric field is produced between said cathode and said anode for the production of ions and also between said source of positive ions and said target for the acceleration of ions.

2. A compact apparatus for accelerating ions which is adapted to operate in restricted areas such as boreholes or other areas to which only a limited amount of electric power can be supplied, comprising in combination: a source of positive ions including an anode, a cathode including a hollow electrode enclosing said anode, and means for producing a magnetic field of sufficient intensity to cause electrons accelerated between said cathode and said anode to initiate and maintain a discharge within the source of positive ions despite the low pressure of the gas in the hollow electrode; a target spaced from said source of positive ions; a hermetically sealed enclosure enclosing said source of positive ions and said target and containing gas at reduced pressure; a single electrostatic belt-type generator adapted to deliver positive electric current from said target to said anode, whereby an electric field is produced between said cathode and said anode for the production of ions and also between said source of positive ions and said target for the acceleration of ions; and a non-linear impedance electrically connected between said cathode and said target.

3. Apparatus in accordance with claim 2 wherein said non-linear impedance comprises a corona discharge device.

4. Apparatus in accordance with claim 2 wherein a resistance is electrically connected between said anode and said cathode.

*5. An ion accelerator comprising a source of electrical power, an acceleration tube having an ion producing portion and an ion accelerating portion, means including said source of electrical power for applying current through said ion producing portion, means applying at least part of said current through said ion accelerating portion in series with said ion producing portion.*

*6. An ion accelerator comprising a constant current source, an acceleration tube having an ion producing portion and an ion accelerating portion, means including said current source for applying current through said ion producing portion, means applying at least part of said current through said ion accelerating portion in series with said ion producing portion.*

*7. An ion accelerator comprising a current source, an acceleration tube having an ion producing portion and an ion accelerating portion, means including said current source for applying current through said ion producing portion, voltage regulating means, and means in series with the current through said ion producing portion applying said current in parallel through said ion accelerating portion and said voltage regulating means.*

*8. An ion accelerator comprising a current source, an acceleration tube having an ion producing portion and an ion accelerating portion, means including said current source for applying current through said ion producing portion, a corona gap in parallel with said ion accelerating portion, and means in series with said current through said ion producing portion applying said current in parallel through said ion accelerating portion and said corona gap.*

*9. An ion accelerator comprising a source of electrical power; an acceleration tube having a first electrode, an intermediate electrode and target electrode; and means connecting said source to maintain said first electrode at a potential which is high with respect to said target electrode; said intermediate electrode being electrically isolated from said first electrode and said target electrode.*

*10. An ion accelerator comprising a current source; an acceleration tube having a first electrode, an intermediate electrode, and a target electrode; means connecting said current source to maintain said first electrode at a potential which is high with respect to said target electrode; and means maintaining said intermediate electrode at a potential intermediate the potentials of said first electrode and said target electrode while maintaining the current through said acceleration tube constant.*

*11. An ion accelerator comprising a constant current source; an acceleration tube having a first electrode, a second electrode, and a target electrode, said second electrode being positioned between said first electrode and said target electrode; and means connecting said current source to maintain said first electrode at a potential which is high with respect to said target electrode; said second electrode being electrically isolated from said first electrode.*

*12. An ion accelerator comprising a current source; an acceleration tube having a first electrode, a second electrode, and a target electrode, said second electrode being positioned between said first electrode and said target electrode; means connecting said current source to maintain said first electrode at a potential which is high with respect to said target electrode; means electrically isolating said second electrode; and means maintaining the current between said first and second electrodes equal to the current between said second electrode and said target electrode.*

*13. An ion accelerator comprising a current source; an acceleration tube having a first electrode, a second electrode, and a target electrode, said second electrode being positioned between said first electrode and said target electrode; electrode extension means electrically connected to said second electrode and extending outside of said acceleration tube; target extension means electrically connected to said target and extending outside of said acceleration tube; means connecting said current source to apply current between said first and second electrodes; and means connected in series with the current between said first and second electrodes to apply said current in parallel between said second electrode and said target and between said electrode extension and said target extension.*

*14. An ion accelerator comprising a current source; an acceleration tube having a first electrode, a second electrode, and a target electrode, said second electrode being positioned between said first electrode and said target electrode; electrode extension means electrically connected to said second electrode and extending outside of said acceleration tube; target extension means electrically connected to said target and extending outside of said acceleration tube; a corona point mounted on said target extension; means connecting said current source to apply current between said first and second electrodes; and means connected in series with the current between said first and second electrodes to apply said current in parallel between said second electrode and said target and between said electrode extension and said corona point.*

*15. An ion accelerator comprising a current source; an acceleration tube comprising a central electrode, a second electrode encircling and spaced from said central electrode, and a target electrode encircling and spaced from said second electrode; electrode extension means electrically connected to said second electrode and extending outside of said acceleration tube; target extension means electrically connected to said target and extending outside of said acceleration tube; a corona point mounted on said target extension means; means maintaining said central electrode at a potential which is high with respect to said target electrode; and means electrically isolating said second electrode.*

*16. An ion accelerator comprising a current source; an acceleration tube comprising a central electrode, a a second electrode encircling and spaced from said central electrode, a suppressor electrode encircling and spaced from said second electrode, and a target electrode encircling and spaced from said suppressor electrode; electrode extension means electrically connected to said second electrode and extending outside of said acceleration tube; target extension means electrically connected to said target and extending outside of said acceleration tube; a corona point mounted on said target extension means; means maintaining said central electrode at a potential which is high with respect to said target; means electrically isolating said second electrode; and means maintaining said suppressor electrode at a potential which is negative with respect to said target.*

References Cited

The following references, cited by the Examiner, are or record in the patented file of this patent or the original patent.

UNITED STATES PATENTS

| | | | |
|---|---|---|---|
| 2,524,031 | 10/1950 | Arps. | |
| 2,697,793 | 12/1954 | Trump. | |
| 2,769,096 | 10/1956 | Frey. | |
| 2,789,241 | 4/1957 | Frey. | |
| 2,863,812 | 12/1958 | Graham. | |
| 2,907,884 | 10/1959 | Gale | 250—24.5 |
| 2,960,610 | 11/1960 | Gale | 250—84.5 |

DAVID J. GALVIN, *Primary Examiner.*

GEORGE N. WESTBY, *Examiner.*

V. LAFRANCHI, *Assistant Examiner.*